(12) United States Patent
Ue et al.

(10) Patent No.: US 6,741,404 B2
(45) Date of Patent: May 25, 2004

(54) LENS BARREL

(75) Inventors: Takaaki Ue, Hachioji (JP); Ai Midorikawa, Saitama (JP)

(73) Assignee: Olympus Optical Co., Ltd., Tokyo (JP)

( * ) Notice: Subject to any disclaimer, the term of this patent is extended or adjusted under 35 U.S.C. 154(b) by 49 days.

(21) Appl. No.: 10/139,059

(22) Filed: May 3, 2002

(65) Prior Publication Data

US 2002/0176180 A1 Nov. 28, 2002

(30) Foreign Application Priority Data

May 23, 2001 (JP) ........................................ 2001-154371

(51) Int. Cl.$^7$ ................................................. G02B 7/02
(52) U.S. Cl. .................... 359/811; 359/813; 359/819; 359/821; 359/822; 359/826; 359/829
(58) Field of Search ................................. 359/811, 813, 359/819, 821, 822, 826, 829, 830

(56) References Cited

U.S. PATENT DOCUMENTS 5,636,064 A * 6/1997 Nomura et al. ............. 359/704
6,335,834 B1 * 1/2002 Nomura et al. ............. 359/700

FOREIGN PATENT DOCUMENTS

JP 58-118612 A 7/1983

* cited by examiner

*Primary Examiner*—Georgia Epps
*Assistant Examiner*—Timothy J Thompson
(74) *Attorney, Agent, or Firm*—Frishauf, Holtz, Goodman & Chick, P.C.

(57) ABSTRACT

An external helicoid thread is provided which includes a helicoid thread having a first ridge whose both flanks are formed at a first flank angle, and a helicoid thread having a second ridge whose both flanks are formed at a second flank angle which is different from the first flank angle. An internal helicoid thread is kept in screwed-state engagement with the external helicoid threads. And in a lens barrel obtained using a connection based on such internal and external helicoid threads, the connection provided by these helicoid threads can remain secured even if a sudden outside force is applied to the lens barrel.

19 Claims, 4 Drawing Sheets

LENS BARREL

This application claims benefit of Japanese Application No. 2001-154371 filed on May 23, 2001, the contents of which are incorporated herein by reference.

BACKGROUND OF THE INVENTION

1. Field of the Invention

The present invention relates to a lens barrel for a camera or the like equipped with a plurality of lens frames capable of moving in the direction of an optical axis, wherein the lens barrel is configured such that the lens frames are securely linked to each other.

2. Description of Related Art

In conventional practice, lens frames are often connected to each other by helicoid threads to allow the lens frames to move smoothly in the direction of the optical axis in the lens barrel of a zoom lens and the like of a camera.

A technique in which not only backlash play (that is, play in the thrust direction), but also radial-fit play (that is, play in the radial direction) can be eliminated by causing a roller fitted onto a roller axle to engage one of the faces of the helicoid thread provided to one of the frames is disclosed, for example, in Japanese Patent Laid-open Publication No. 58-118612 as a conventional connection means involving the use of such helicoid threads.

It should be noted, however, that large forces are applied to the joints between the lens frames in such lens barrels when the user accidentally drops the camera or the camera is subjected to an impact or shock.

Screwed joints formed by helicoid threads must therefore be prevented from being easily disengaged in order to allow lens frames to remain connected when an outside force acts in a direction in which the threaded engagement between the helicoid threads may be loosened.

The above-described example of the prior art is disadvantageous in that it is aimed solely at eliminating play in the thrust direction and play in the radial direction and in that it lacks the function of preventing the joint between the lens frames from being loosened. In addition, because the roller is configured to conform to the shape of the contacting helicoid threads, the roller tends to disengage in the same manner as the other portions of the helicoid threads.

An object of the present invention, which was perfected in view of the above situation, is to provide a lens barrel based on the use of a connection provided by helicoid threads, wherein the lens barrel is configured such that the connection provided by the helicoid threads can remain secured when a sudden outside force is applied to the lens barrel.

SUMMARY OF THE INVENTION

There is provided a first frame equipped with helicoid threads comprising a first helicoid thread having a ridge in which both flanks of the ridge are formed at a first flank angle, and a second helicoid thread having a ridge in which both flanks of the ridge are formed at a second flank angle which is different from the first flank angle; and a second frame provided with helicoid threads in screwed-state engagement with the corresponding first and second helicoid threads on the first frame.

The above and other objects, features, and advantages of the invention will become more clearly understood from the following description referring to the accompanying drawings.

DETAILED DESCRIPTION OF PREFERRED EMBODIMENTS

An embodiment of the present invention will now be described based on FIGS. 1 to 5.

Figure 1:
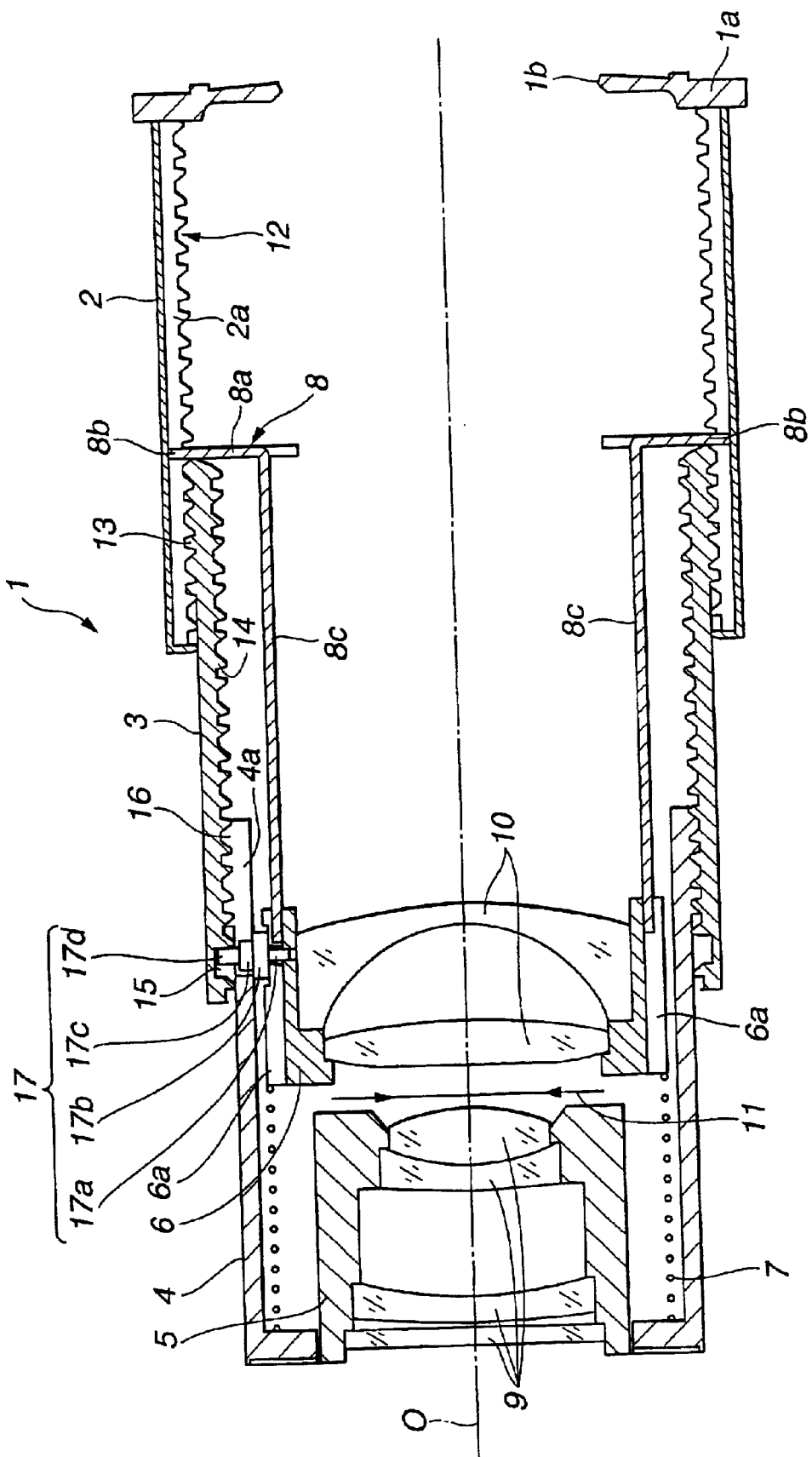
FIG. 1 is a longitudinal sectional view along the optical axis of a lens barrel as the photographing lens of a camera.

In FIG. 1, 1 is a lens barrel. The lens barrel 1 comprises a fixed frame 2 that allows zooming to be performed and that is fixed to a camera main body (not shown); a rotary frame 3 that is rotatably and retractably supported on the fixed frame 2 and can be rotatably moved by a lens frame drive unit (not shown); a zoom frame 4 supported so as to rotate relatively and also to move retractively with respect to the rotary frame 3; a first-assembly frame 5 for supporting a first lens assembly 9; a second-assembly frame 6 for supporting a second lens assembly 10 and a shutter 11; and a rectilinear key 8.

The fixed frame 2 is provided with an internal helicoid thread 12 on the internal peripheral surface thereof, and with a rectilinear guide groove 2a for guiding the rectilinear motion of the rectilinear key 8 in the direction of optical axis O.

The rotary frame 3 comprises an external helicoid thread 13 which is kept in threaded engagement with the internal helicoid thread 12 and is provided to the external peripheral surface of the barrel in the vicinity of the back end thereof (the end that faces the camera main body), and an internal helicoid thread 14 on the internal peripheral surface thereof.

The rotary frame 3 further comprises a plurality of (for example, three) cam grooves 15 disposed on the internal peripheral surface and moved in an oblique spiral with respect to the direction of optical axis while superposed in an overlapping manner with the internal helicoid threads 12. When rotatably driven by the lens frame drive unit (not shown), the rotary frame 3 is brought out from a recessed position to a prescribed photographing position while rotated with respect to the fixed frame 2.

The rectilinear key 8 comprises projection 8b which is extended in the circumferential direction away from an annularly shaped base end portion 8a and is slidably inserted into the rectilinear guide groove 2a of the fixed frame 2, and a key portion 8c which is extended forward into the lens barrel 1 away from the base end portion 8a and is used to rectilinearly guide the second-assembly frame 6 in a direct manner by fitting into and sliding along a rectilinear groove 6a provided to the second-assembly frame 6.

While the rotary frame 3 is rotated relatively, the rectilinear key 8 is retractably moved in the direction of the optical axis as an integral unit with the rotary frame 3 in a state in which the system is rectilinearly guided by a conventional support structure without being rotated with respect to the fixed frame 2.

The zoom frame 4 is formed in a cylindrical shape and is provided with an external helicoid thread 16 in screwed-state engagement with the internal helicoid thread 14 of the rotary frame 3 on the external peripheral surface in the vicinity of the back end of the cylindrical shape, and on the back portion of the cylindrical section thereof is provided a narrow guide groove 4a that runs through the frame in the direction of the optical axis away from the back end.

The first-assembly frame 5 is housed in an anchored manner inside the zoom frame 4 at the front end thereof (at the side facing the object to be photographed). When the rotary frame 3 is rotated using this structure, the zoom frame 4 is checked in its ability to rotate and is rectilinearly guided via the guide groove 4a by cam followers 17 provided to the second-assembly frame 6, and is advanced or retracted with respect to the rotary frame 3. Three cam followers 17 may be provided at substantially equal intervals along the same circumference on the outside surface of the second-assembly frame 6.

The second-assembly frame 6 is provided with the key groove 6a capable of being slidably inserted into the key portion 8c of the rectilinear key 8. A forcing spring 7 as a compression spring is further provided between the distal surface of the second-assembly frame 6 and the inside of the distal surface of the zoom frame 4, causing the distal surface of the second-assembly frame 6 and the inside of the distal surface of the zoom frame 4 to be constantly urged in the direction in which they are separated from each other.

The second-assembly frame 6 is rectilinearly guided by the rectilinear key 8 and is advanced or retracted with respect to the rotary frame 3 by the movement of cam followers 17 along the cam grooves 15 of the rotary frame 3.

The three cam followers 17 can, for example, be attached and detached through the respective mounting holes of the zoom frame 4 and formed into a three-tier structure composed of the following portions, each having a different diameter: an axial portion 17a embedded in the zoom frame 4, an optical axis adjusting portion 17b formed to have a prescribed thickness and designed to adjust the gap between the internal surface of the zoom frame 4 and the external surface of the second-assembly frame 6, that is, to adjust optical axis of the second lens assembly 10, a rectilinear guide sliding portion 17c whose lateral surface is slidably engaged with the guide groove 4a of the zoom frame 4, and a cam groove sliding portion 17d whose lateral surface is slidably engaged with the cam groove 15 of the rotary frame 3.

Figure 2:
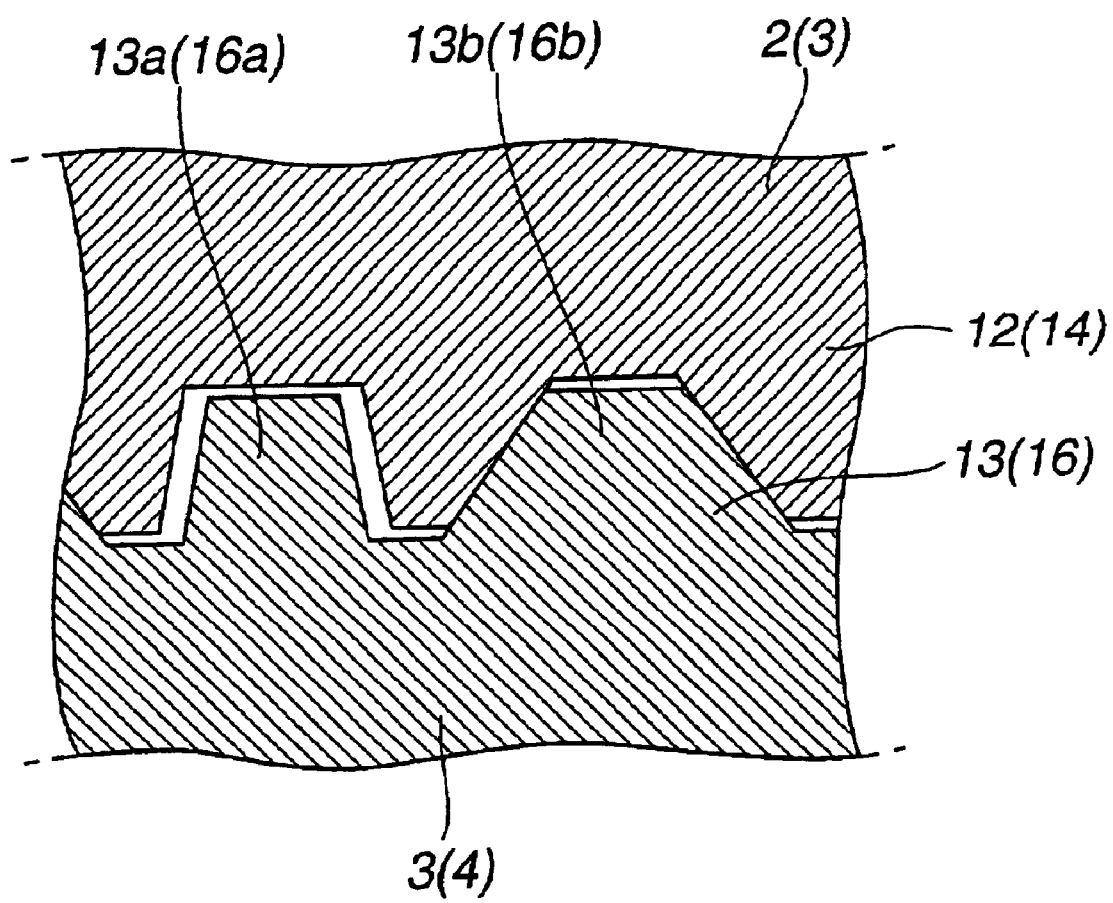
FIG. 2 is a sectional view depicting a state in which helicoid threads are engaged being screwed under regular conditions.

In the condition referred to herein as "regular screwed-state engagement," the ridges 13b and 16b of the male helicoid threads 13 and 16 form a tight threaded fit with the root portions 12b and 14b of the internal helicoid threads 12 and 14 in screwed-state engagement therewith, as shown in FIG. 2. Gaps are therefore formed between the ridges 13a and 16a of the external helicoid threads 13 and 16, and the root portions 12a and 14a of the internal helicoid threads.

Following is a detailed description of the area in which the internal helicoid thread 12 of the fixed frame 2 and the external helicoid thread 13 of the rotary frame 3 are kept in a screwed-state engagement with each other.

Figure 3:
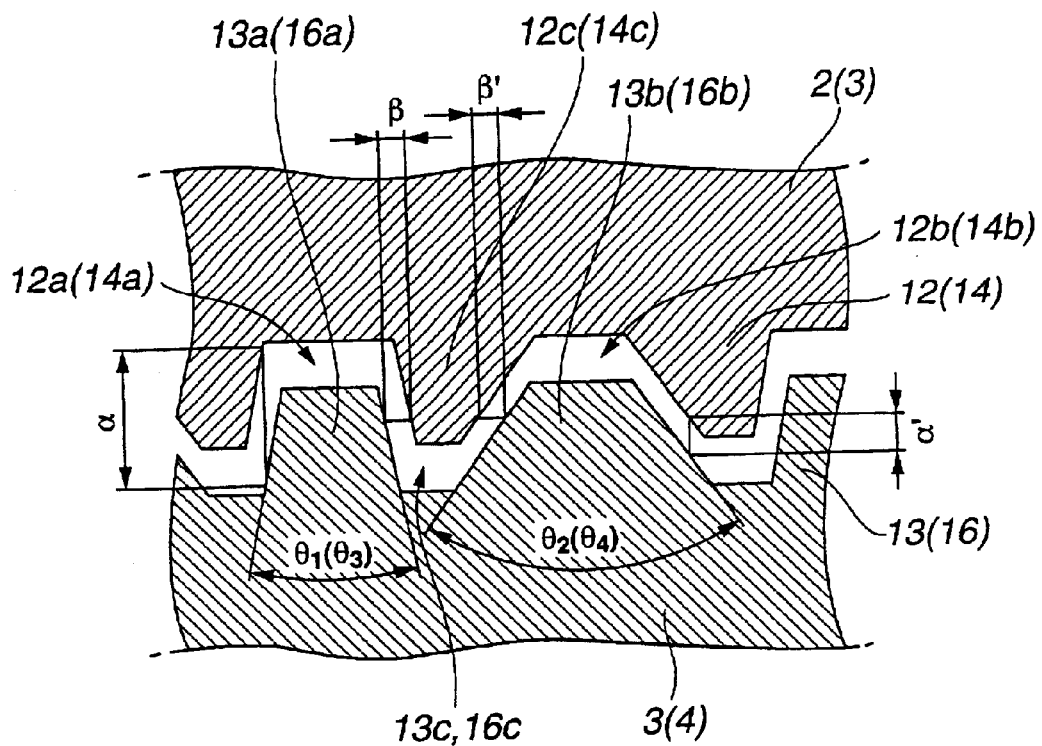
FIG. 3 is a sectional view depicting in greater detail helicoid threads in a state in which an outside force acts in the direction in which the screwed-state engagement of the helicoid threads are loosened.

The external helicoid thread 13 of the rotary frame 3 comprises helicoid threads with first ridge 13a whose both flanks are formed at a first flank angle, and helicoid threads with second ridge 13b whose both flanks are formed at a second flank angle which is different from the first flank angle, as shown in FIG. 3.

The first and second ridges can thus be formed into multistart threads, assuming that the ridge angle $\theta_1$ of the first ridge 13a, expressed as double the first flank angle, has a low value (for example, 20°), and that the ridge angle $\theta_2$ of the second ridge 13b, expressed as double the second flank angle, has a value greater than $\theta_1$ (for example, 70°).

In view of this, the helicoid thread of the first ridge 13a formed at the first flank angle is formed only along part of the entire circumference of the helicoid thread into an intermittent (discontinuous) configuration formed by the spiral line of the threads in accordance with the traveling trajectory.

This approach is adopted in order to take into account the insufficient draft angle maintained during molding because the ridge angle $\theta_1$ of the first ridge 13a has a low value, thus making it possible to facilitate molding by adopting such an intermittent (discontinuous) configuration.

Figure 5:
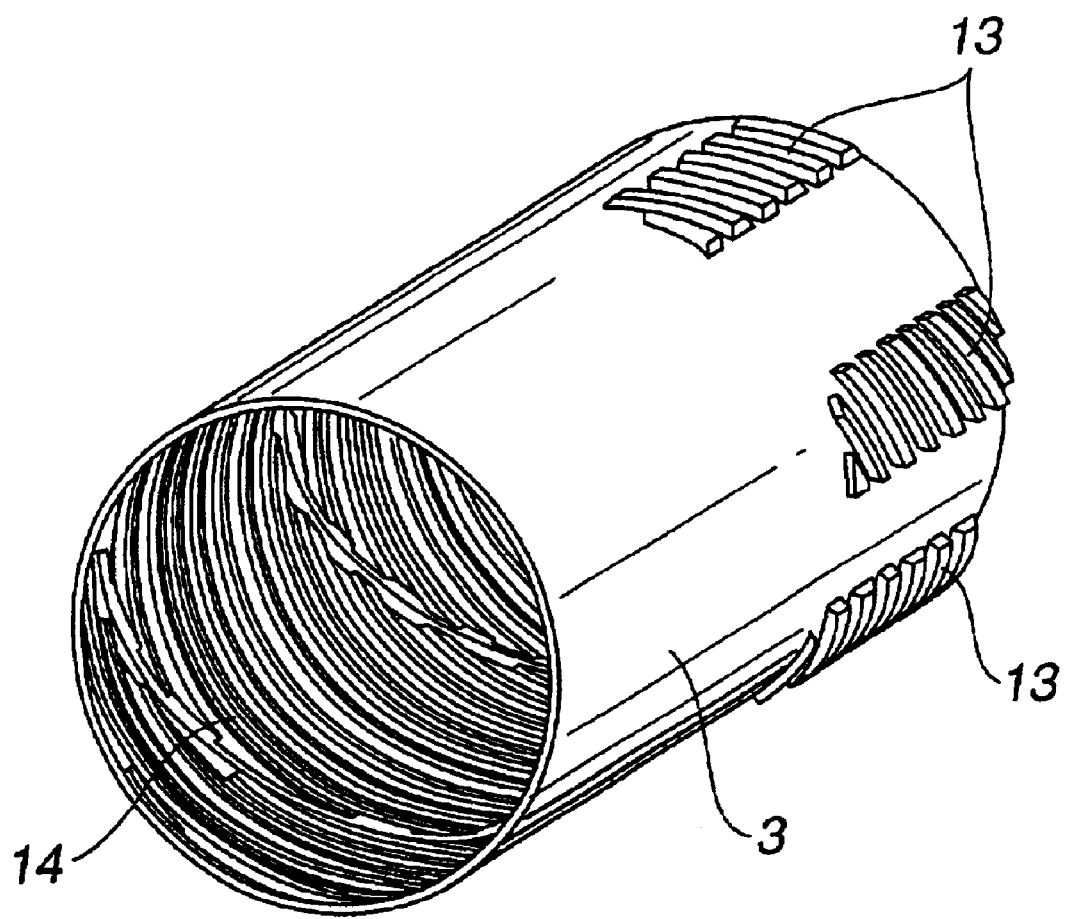
FIG. 5 is a perspective top view depicting an external thread on the outside of a rotary frame.

FIG. 5 depicts the above-described structure. In FIG. 5, the entire external helicoid threads 13 (that is, not only the first ridge 13a, but also the second ridge 13b) are formed into an intermittent (discontinuous) configuration.

The thread roots are configured to allow the internal helicoid threads 12 of the fixed frame 2 to engage by screwing the external helicoid thread 13 of the rotary frame 3, and to permit the rotary frame 3 to smoothly rotate with respect to the fixed frame 2.

According to the present embodiment, combining the helicoid threads of the fixed frame 2 and the rotary frame 3 in this manner yields a configuration in which the rotary frame 3 serves as a first frame, and the fixed frame 2 serves as a second frame.

The internal helicoid thread 14 of the rotary frame 3 and the external helicoid thread 16 of the zoom frame 4 are configured in a similar manner.

Specifically, the external helicoid thread 16 of the zoom frame 4 comprises a helicoid thread with first ridge 16a (whose both flanks are formed at a first flank angle), and a helicoid thread with second ridge 16b (whose both flanks are formed at a second flank angle, which is different from the first flank angle).

The first and second ridges can thus be formed into multistart threads, assuming that the ridge angle $\theta_3$ of the first ridge 16a, expressed as double the first flank angle, has a low value (for example, 20°), and that the ridge angle $\theta_4$ of the second ridge 16b, expressed as double the second flank angle, has a value greater than $\theta_3$ (for example, 70°).

In view of this, the helicoid thread of the first ridge 16a formed at the first flank angle is formed only along part of the entire circumference of the helicoid thread into an intermittent (discontinuous) configuration formed by the spiral line of the thread in accordance with the traveling trajectory.

This approach is adopted in order to take into account the insufficient draft angle maintained during molding because the ridge angle $\theta_3$ of the first ridge 16a has a low value, thus making it possible to facilitate molding by adopting such an intermittent (discontinuous) configuration.

Although this is not shown in the drawings in any particular way, the entire external helicoid thread 16 (that is, not only the first ridge 16a, but also the second ridge 16b) is formed into an intermittent (discontinuous) configuration in the same manner as the external helicoid thread 13 of the rotary frame 3 shown in FIG. 5 above.

The internal helicoid thread 14 of the rotary frame 3 is provided with thread roots in screwed-state engagement with the external helicoid thread 16 of the zoom frame 4, allowing the rotary frame 3 to smoothly rotate with respect to the zoom frame 4.

According to the present embodiment, combining the helicoid threads of the rotary frame 3 and zoom frame 4 in this manner yields a configuration in which the zoom frame 4 serves as a first frame, and the rotary frame 3 serves as a second frame.

Combining the helicoid threads of the fixed frame 2 and the rotary frame 3, or the helicoid threads of the rotary frame 3 and the zoom frame 4, in this manner allows the component force acting in the direction in which the connection between the helicoid threads is loosened in the screwed joint of the first ridges 13a and 16a (whose both flanks have a narrow flank angle) to be reduced and absorbed when an outside force is applied in a direction in which the threaded connection between the external helicoid threads 13 and 16 and the internal helicoid threads 12 and 14 is loosened. A connection provided by each helicoid thread can therefore be securely maintained.

As shown by β and β' in FIG. 3, the gap between the screwed and engaged external helicoid threads 13, 16 and internal helicoid threads 12, 14 (that is, the gap in the thrust direction, which agrees with the direction of optical axis) is narrow (β) in the area of screwed-state engagement of the first ridges 13a and 16a, which have a narrow flank angle, and is wide (β') in the area of screwed-state engagement of the second ridges 13b and 16b, which have a wide flank angle.

Figure 4:
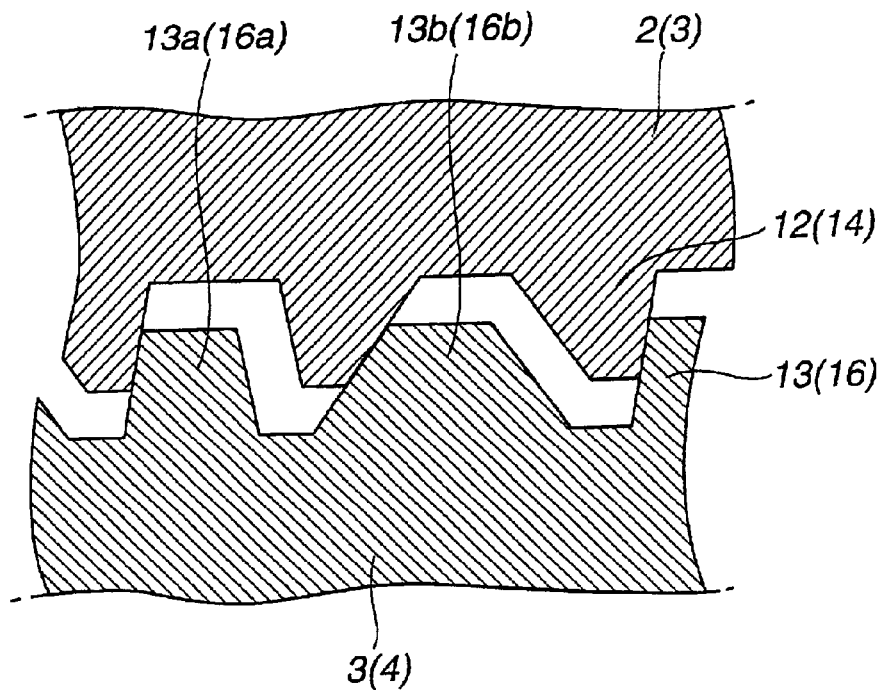
FIG. 4 is a sectional view depicting a state in which the helicoid threads of FIG. 3 have moved relatively in the thrust direction.

The result is that if the external helicoid threads 13 and 16 or the internal helicoid threads 12 and 14 are caused to move relatively each other in the thrust direction in the manner shown in FIG. 4, the sloped surfaces of the first ridges 13a and 16a come into contact with the ridges of the other screwed and engaged component, making it possible to efficiently control chatter in the thrust direction.

As shown by α and α' in FIG. 3, the gap between the screwed and engaged external helicoid threads 13, 16 and internal helicoid threads 12, 14 (that is, the gap in the radial direction, which is orthogonal to the thrust direction) is narrow (α) in the area of screwed-state engagement of the first ridges 13a and 16a, which have a narrow flank angle, and is wide (α') in the area of screwed-state engagement of the second ridges 13b and 16b, which have a wide flank angle.

According to the present embodiment, the external helicoid threads 13 and 16 comprise helicoid threads with first ridges 13a and 16a (whose both flanks are formed at a first flank angle) and helicoid threads with second ridges 13b and 16b (whose both flanks are formed at a second flank angle, which is different from the first flank angle) in the above-described manner, making it possible for the connection between the helicoid threads to remain secure when a sudden outside force is applied to the lens barrel.

Although the present embodiments were described with reference to cases in which the areas containing the first ridges 13a and 16a and the second ridges 13b and 16b were disposed facing the external helicoid threads 13 and 16, it is also possible to adopt an arrangement in which the first and second ridges are disposed facing the internal helicoid threads 12 and 14.

Having described the preferred embodiments of the invention referring to the accompanying drawings, it should be understood that the present invention is not limited to those precise embodiments, and various changes and modifications thereof could be made by one skilled in the art without departing from the spirit or scope of the invention as defined in the appended claims.

What is claimed is:

1. A lens barrel comprising:
    a first frame provided with helicoid threads comprising a first helicoid thread having a ridge in which both flanks of the ridge are formed at a first flank angle, and a second helicoid thread having a ridge in which both flanks of the ridge are formed at a second flank angle which is different from said first flank angle; and
    a second frame provided with helicoid threads in screwed-state engagement with said first helicoid thread on said first frame and with said second helicoid thread on said first frame.

2. The lens barrel according to claim 1, wherein at least one of the first and second helicoid threads of said first frame is a multistart thread.

3. The lens barrel according to claim 1, wherein at least one of the first and second helicoid threads of said first frame is configured such that spiral ridges are formed intermittently along a circumference of the thread, with parts being left unformed in a middle portion of the thread.

4. The lens barrel according to claim 1, wherein said first helicoid thread and said second helicoid thread are external helicoid threads.

5. The lens barrel according to claim 4, wherein said helicoid threads of said second frame comprise a first internal helicoid thread in screwed-state engagement with said first helicoid thread of said first frame, and a second internal helicoid thread in screwed-state engagement with said second helicoid thread of said first frame.

6. The lens barrel according to claim 1, wherein said first helicoid thread and said second helicoid thread are internal helicoid threads.

7. The lens barrel according to claim 1, wherein the ridge of said first helicoid thread and the ridge of said second helicoid thread are formed at alternate positions in a direction in which the first frame and the second frame are caused to move by the helicoid threads.

8. The lens barrel according to claim 1, wherein the ridge of said first helicoid thread is formed between a mating ridge of said second helicoid thread.

9. The lens barrel according to claim 1, wherein the first flank angle of said first helicoid thread is smaller than the second flank angle of said second helicoid thread.

10. The lens barrel according to claim 9, wherein a screwed joint of said second helicoid thread forms a tight fit, and a screwed joint of said first helicoid thread has a gap when said first frame and said second frame operate in a normal state.

11. The lens barrel according to claim 10, wherein the screwed joint of said first helicoid thread can form a tight fit when an outside force acts in a direction in which the screwed-state engagement between the helicoid threads of said first frame and said second frame can be loosened.

12. A lens barrel comprising:
    an external helicoid thread frame equipped with a first external helicoid thread having a first flank angle, and a second external helicoid thread having a second flank angle which is different from said first flank angle; and
    an internal helicoid thread frame equipped with a first internal helicoid thread in screwed-state engagement with said first external helicoid thread, and a second internal helicoid thread in screwed-state engagement with said second internal helicoid thread.

13. The lens barrel according to claim 12, wherein said first internal helicoid thread has first root portion whose two lateral walls are formed at a first flank angle, and said second internal helicoid thread has second root portion whose two lateral walls are formed at a second flank angle.

14. The lens barrel according to claim 12, wherein the ridge of said first external helicoid thread and the ridge of said second external helicoid thread are formed at alternate positions in the direction in which the components are caused to move by the screwed-state engagement of the helicoid threads.

15. The lens barrel according to claim 12, wherein the ridge of said first external helicoid thread are formed between the mating ridge of said second external helicoid thread.

16. The lens barrel according to claim 13, wherein the screwed joint of the second external helicoid thread and second internal helicoid thread forms a tight fit, and the screwed joint of said first external helicoid thread and said first internal helicoid thread has a gap when said external helicoid thread frame and said internal helicoid thread frame operate in a normal state.

17. The lens barrel according to claim 16, wherein a screwed joint of said first external helicoid thread and said first internal helicoid thread can form a tight fit when an outside force acts in a direction in which the screwed-state engagement between the helicoid threads of said external helicoid thread frame and said internal helicoid thread frame can be loosened.

18. The lens barrel according to claim 16, wherein the first flank angle of said first external helicoid thread is smaller than the second flank angle of said second external helicoid thread.

19. The lens barrel according to claim 16, wherein a bottom width of a ridge of said first external helicoid thread is smaller than a bottom width of a ridge of said second external helicoid thread.

* * * * *